Sept. 12, 1967 E. E. MASTERSON 3,341,193

DOCUMENT PICKER

Filed May 7, 1965 3 Sheets-Sheet 1

INVENTOR.
EARL E. MASTERSON

BY John J. McCormack
ATTORNEY.

Sept. 12, 1967 E. E. MASTERSON 3,341,193

DOCUMENT PICKER

Filed May 7, 1965 3 Sheets-Sheet 2

INVENTOR.
EARL E. MASTERSON

Sept. 12, 1967 E. E. MASTERSON 3,341,193

DOCUMENT PICKER

Filed May 7, 1965 3 Sheets-Sheet 3

INVENTOR.
EARL E. MASTERSON

BY John J. McCormack
ATTORNEY.

United States Patent Office 3,341,193
Patented Sept. 12, 1967

3,341,193
DOCUMENT PICKER

Earl E. Masterson, Newtonville, Mass., assignor to Honeywell Inc., Minneapolis, Minn., a corporation of Delaware Filed May 7, 1965, Ser. No. 454,076
16 Claims. (Cl. 271—10)

The present invention relates to apparatus for handling record media associated with data processing systems. More particularly, the invention is concerned with new and improved apparatus for feeding computer documents from a stack into a utilization system, the apparatus being characterized by its ability to engage said records along curved surfaces thereof by resiliently conforming thereto while thereafter returning to a home-position, and by its ability to provide such feeding by a simplified reciprocating mechanism which has no abrading wear points.

Unit-record advancing devices, such as pickers for punched cards and the like, are widely used for purposes of selecting records from a stack and advancing them towards a utilization device for suitable data processing or tabulating functions. In the data processing arts, the speed of record handling, has become a severely limiting factor upon the overall speed of data processing, especially for high-speed electronic systems. Hence, in an effort to increase processing speeds, workers in the art have endeavored for some time to design record handling equipment, such as card pickers, which can operate (e.g. reciprocate) ever faster and faster. However, in the operation of reciprocating devices which customarily employ pivot points, subject to abrasive or frictional wear, it is axiomatic that as operating speeds increase, so also does the incidence of failure due to abrasive wear. Thus, it is an object of the present invention to eliminate abrading surfaces, for instance, by using flexible plates of a certain simplified type for pivotably supporting record-handling devices which have hitherto exhibited wear-pivots. More particularly, the invention contemplates the use of flexure leaf structures, the flexures of which are designed to be limited to safe levels and to thus provide a simple, resilient wear-resistant suspension for reciprocating elements.

Abrasive wear has been characteristic of structures such as linkage, pivot and suspension elements, associated with prior art card advancing mechanisms. Such elements comprise pivoting connections for reciprocating members and suspensions for resilient, reciprocating members. Such prior art structures have been typically complex and expensive to build and maintain. Maintenance and wear problems have often been caused by lubrication requirements which are easy to ignore or misconstrue, especially by computer attendants who are primarily electronic technicians, not mechanics. Lubricated points are also troublesome in that they collect grit and dust, especially the "card-dust" commonly associated with card-handling apparatus. This grit has a "wick" action, absorbing lubricant and quickly rendering it ineffective. As a result of these problems, prior art reciprocating structures have quickly worn away, have become loosened and backlash-prone and have become misaligned, noisy, and otherwise troublesome. Among the principal objects of the invention, therefore, is the provision of a record advance mechanism incorporating suspension means which exhibits no wear-points or associated abrading surfaces, which is simple and inexpensive to make and maintain, which requires no lubrication and has no backlash and which is not subject to any substantial loosening, misalignment, or noisiness during extended operation.

Associated with the increasing high speeds of record advance are the problems of feed-reliability at these high speeds. For instance, in card selection means, i.e. card-pickers, there is less and less time to reciprocate the picking mechanism and to position it relative to the edge of an associated card for engagement therewith. Associated problems are those of card mutilation, misfeed and jam, since at these high feeding-speeds, there is less opportunity to detect and provide for error conditions, such as misalignment of a punch card. The likelihood is increased that misaligned cards may be mutilated by the card-advancing mechanism. Such mutilation or jamming often results with cards that are slightly "bowed" when presented to picker knives. But, since picker knives must be carefully aligned with respect to the card-edge surface they must engage, card-bowing is highly problematical. Further, the area of knife-card engagement is characteristically minute, being less than the thickness of a thin punched-card. Given such close engaging tolerances, it is easy to understand how, when a card is slightly bowed, one or both of two picker knives will only partially engage the card edge and thus perhaps mutilate it or advance the card skewingly. Such mutilation or misalignment can readily cause a jam at constricted passages along the card path such as at the narrow picker throat. Such a bowed card commonly occurs in a small stack of a few cards which present no appreciable load against the picker knife mechanism.

The present invention obviates the above problems by providing picker knife elements which are adapted to conform to such bowed card edges and not lose contact therewith during their advancing thrust. According to the invention, a wear-proof flexure plate construction is adapted to provide this card-conformance, being adapted to both yieldingly follow the card and, after disengagement therewith, to re-center itself, being self-leveling or straightening. More especially picker elements are mounted upon convergent flexible plate elements, close to the focus thereof, so as to pivot quickly, about a very small radius. Such an arrangement also provides a low mass knife unit, which has a high degree of yield and can "follow" a card quickly. The invention thus provides advancing means, and resilient engaging elements therefor, which, despite high speed operation, are less likely to skip, skew or damage cards or to cause misfeed or jam conditions.

It is, accordingly, an object of the present invention to provide improved record handling apparatus for advancing unit records associated with data processing equipment. It is a more specific object of the invention to provide such apparatus which is characterized by the inclusion of suspension means which are wear-resistant and which eliminate abrading wear-points as connections between reciprocating elements. Still another object is to provide a structure which is characterized also by the inclusion of card-engaging means which are resiliently card-conforming and self-straightening.

Another object is to provide flexible supports enabling picker elements to pivot about minute radii, virtually about themselves.

The foregoing objects of the invention are achieved by the provision of arcuate flexure plates to support card-engaging and pivotable, reciprocating elements thus providing simple, pivotable-joint structures which have no wear-points, which are resiliently self-leveling, which have their pivot centers close to the supported element, and which also include stop means to limit the stressing thereof. The invention also contemplates crank means connected with said engaging and reciprocating support elements by a flexure plate means. The various features of novelty which characterize the invention are pointed out with particularity in the claims annexed to and forming a part of the present specification. For a better understanding of the invention, its advantages, and specific objects attained with its use, reference should be had to the accompanying drawings and descriptive matter, in which there are illustrated and described preferred embodiments of the invention. In the drawings, wherein like reference numerals denote like elements:

Figure 1:
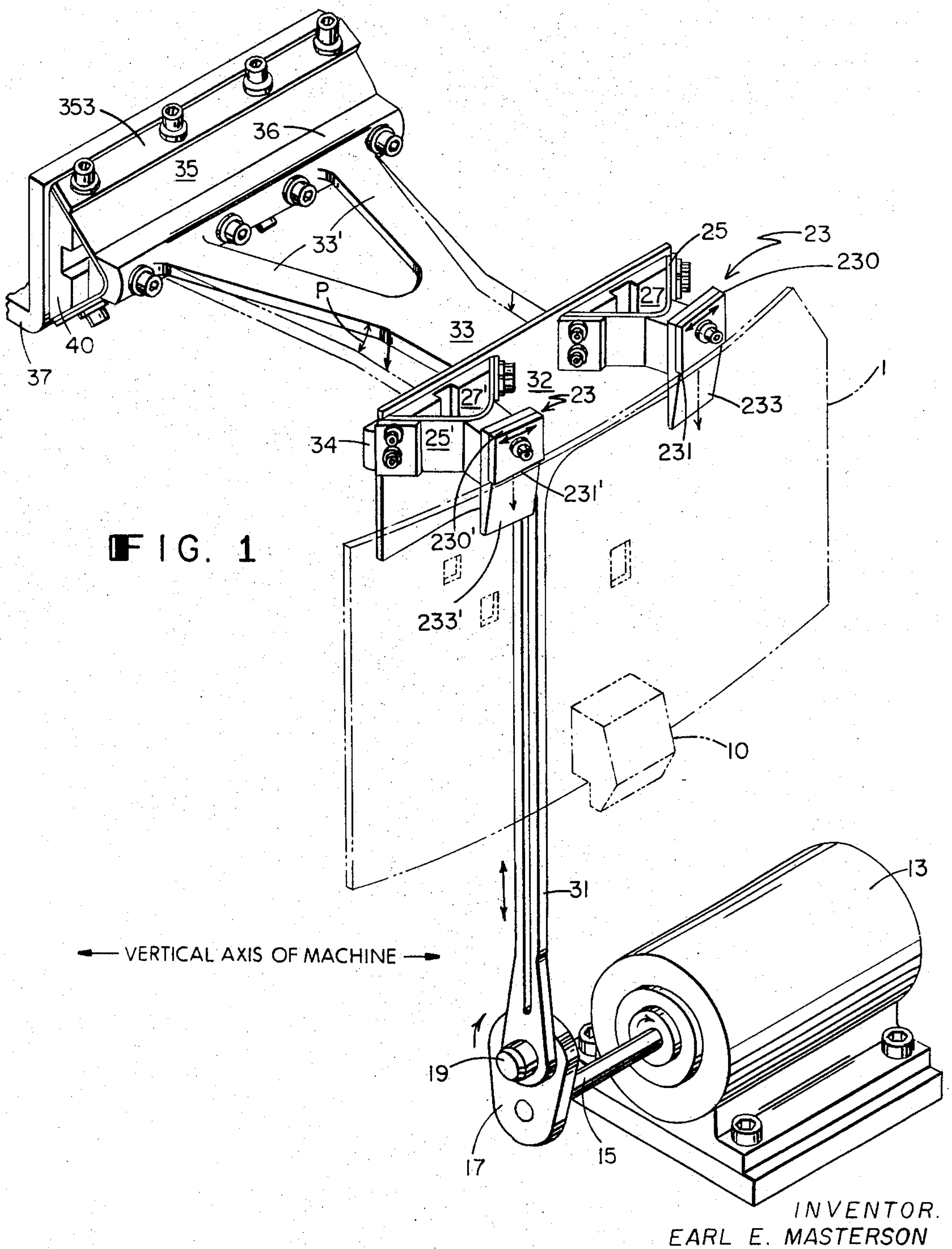
FIGURE 1 is a perspective schematic embodiment of a punched card feeding mechanism according to the invention.

Referring now to the figures, there is shown an embodiment of the invention as applied to a unit record handling device of the type comprising a picker unit for selecting and advancing punched-card record media for data processing. It will be seen, referring to FIGURES 1 and 3, that this card picker mechanism has as its object the efficient reciprocation of picker heads, or knife assemblies 23, 23′ to engage the forward-most card 1 of a stack 3 along one card-edge and to thrust the card through a passage 5, towards a card handling station 8. Handling station 8 may comprise a pair of compressible feed rollers 11, 11′ for engaging cards advanced through passage 5 and advancing them beyond, for instance, to a card-reading station. Passage 5 is defined by base 7 of a hopper (not shown) and an opposed throat block 10 and will conventionally include a constriction, or throat, (not shown) of about a card's thickness. As will become more apparent, the picker unit is driven by a reciprocating drive unit, such as printed circuit motor 13 and eccentric linkage 17, directly connecting motor 13 to picker arm 33. Linkage 17 is adapted to rotatably reciprocate crank 31 which, in turn, reciprocates picker arm 33 along a drive plane, pivoting arm 33 about its connection to a coupling 35 to thereby reciprocate picker heads 23, 23′ up and down. Thus, heads 23, 23′ can advance a single punched card from stack 3 for every cycle of motor 13, the card being quickly removed by feed rollers 11, 11′ along a planar path P. The punched cards 1, 1′ etc. are customarily arranged in a stack 3 in a feed hopper, the base 7 of which is shown. This input hopper is adapted to urge the cards 1, 1′ lightly against the picker heads 23, 23′, for instance by a gravity feed effected by the incline of the hopper base 7. A card weight (not shown) may be used to provide added loading for the feed arrangement.

One of the problems associated with the feeding of cards from such input hoppers is that bowed cards may still retain a slight curvature when pressed against throat block 10 and picker heads 23, 23′. Block 10 and heads 23, 23′ comprise a "tripod" support for positioning cards for insertion through the feed throat. Block 10 and heads 23, 23′ include gently beveled face portions for engaging cards and guiding them toward the plane of path P. At times, the cards may be misaligned being located somewhat above hopper base 7 and/or with their top edge leaning toward knife units 23, 23′. For instance, short cards (e.g. 51 column length) are more apt to bow their ends away from the fixed block 10, as with cards 100, 100′ in FIGURE 2. On the other hand, longer cards (e.g. 80 column length) are apt to bow their ends oppositely, towards picker heads 23, 23′, as with card 1 in FIGURE 1. Beveling block 10 as shown provides a cam guide surface to urge cards gradually toward throat 5 and also reduces a projection about which a card could be severely bent. Beveling the picker heads as shown allows them to engage card edges which project beyond the plane of passage 5 and gradually "return" them to this plane without bending. As explained below, the flexure plate suspension of knife heads 23, 23′ also facilitates the proper handling of such vertically- or horizontally-bowed cards. Bowed cards are commonly presented to a picker mechanism when only a few cards are inserted into an input hopper. Thus, the invention is of special advantage in such cases. It will be recognized that the use of a tripod picker comprising a single central throat block and two knife units symmetrically outboard thereof, can improve picker reliability, e.g. by assuring continuous knife engagement with bowed cards. For example, it was found that a single throat block located intermediate the knives, (i.e. centrally of the cards) will, unlike a pair of outboard blocks, locate the centers both of convexly-bowed and of concavely-bowed cards at a common reference plane; along which plane the knife edges may be aligned. This assures that the knives will engage at least some portion of cards bowed either way. However, while pivotable card-conforming knives are preferable in any case, they are more useful with a single-block arrangement since this single support provides a fulcrum which allows more extreme card-bowing than a pair of throat blocks allows. Hence, the flexible card-conformability of the picker knife arrangement taught herewith has special utility with such single throat block arrangements.

In order to sequentially move the cards 1 from the stack 3, means are provided to reciprocate picker knife assemblies 23, 23′. Double knives are preferred to a single knife since they can "follow" the curve of a bowed card and thrust it in constant alignment, without pivoting it. Such knife units are made resiliently pivotable to conform to and better engage, different card-curvatures, as mentioned. Picker heads 23, 23′ include suitable notches or knife-edges; such as shown at 231′ so as to engage the top (or "12" edge) of a punched card 1, the notch customarily being about the thickness of a typical punched card. The lower faces 233, 233′ of knife heads 23, 23′ are slightly tapered, away from the card, to reduce the likelihood of distorting and bending a card during the initial portion of the down (or advance) stroke of the picker arm which oscillates along an arcuate path P—P, as indicated. Heads 23, 23′ are adapted to be moved reciprocably by crank 31 with respect to the stationary elements of the card-handling apparatus, e.g. block 10 and hopper base 7. Thus, picker heads 23, 23′ are mounted, as described below, to project from one end of flexure plate 32, the other end of which is affixed to the driving end 315 of driving crank 31. Picker arm 33 guides the reciprocating excursions of knife heads 23, 23′, being attached as described below, between fixed support 35 and flexure plate 32.

Figure 3:
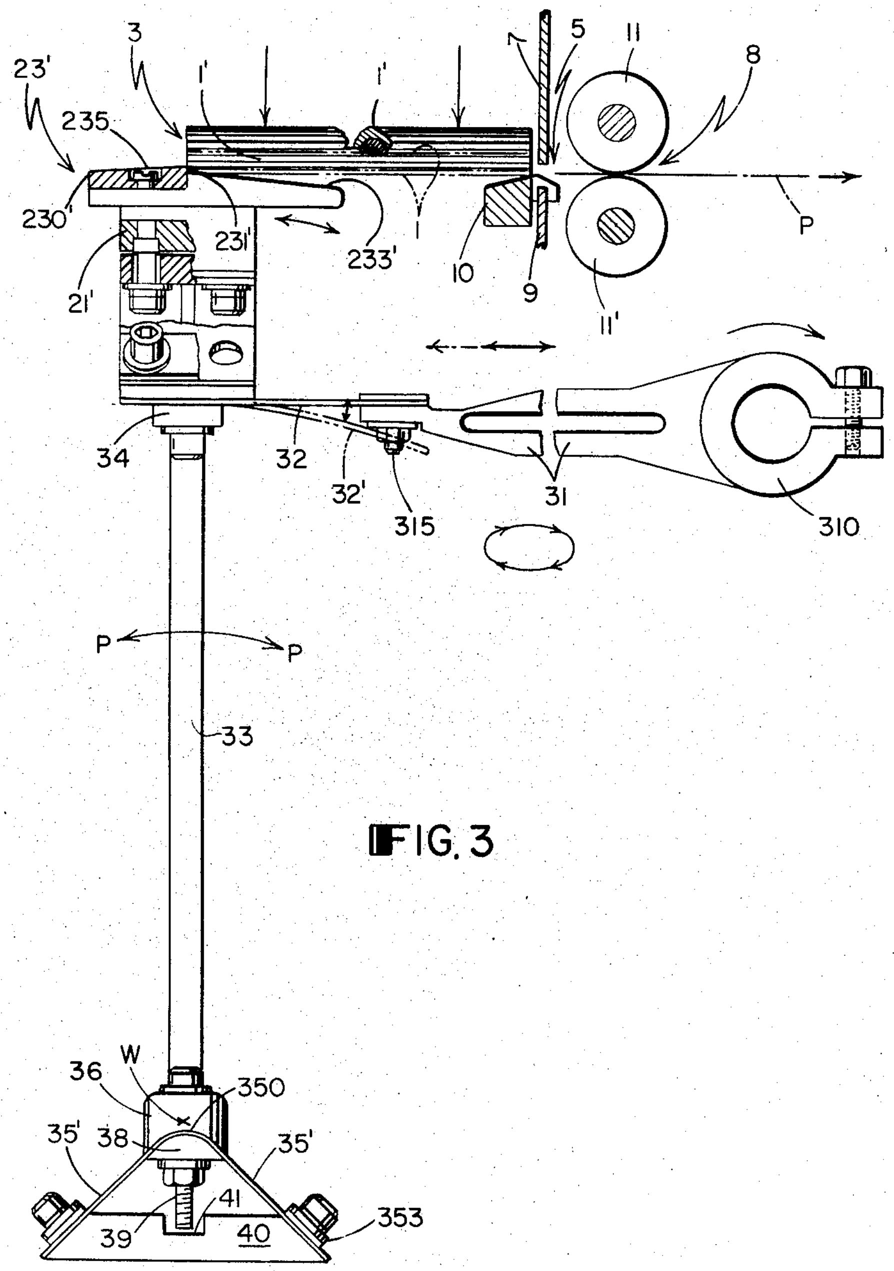
FIGURE 3 is a side elevation, some portions being schematically and some portions sectionally shown, of the card-feeding elements in FIGURE 1.

As seen in FIGURE 3, each knife unit 23, 23′ includes knife-edge inserts 230, 230′ which have edge-portions 231, 231′ and which are attached, by suitable bolt means 235, 235′, to a pair of knife block elements 21, 21′. Blocks 21, 21′ in turn, clampingly engage a pair of flexure plate elements, or legs 25, 25′, respectively, at the mid-sections thereof. Legs 25, 25′ may preferably comprise a unitary plate the mid-section 250, 250′ of which is clamped fixedly between knife blocks 21, 21′ by clamps 26, 26′, bolts 29, 29′ being inserted into registering bores therethrough. Bolts 29, 29′ threadably engage blocks 21, 21′ and clamps 26, 26′ to press these together clampingly and thus bend plates 25, 25′ arcuately. Blocks 21, 21′ are preferably relieved concavely to receive the smoothly-bent apex portion, or bends 250, 250′ of plates 25, 25′. Clamps 26, 26′ are correspondingly chamfered to conform convexly to bends 250, 250′ and thus mate with the cut-out portion of blocks 21, 21′. Thus, flexible plates 25, 25′ form symmetrically convergent legs having a prescribed curvature at the midpoint thereof and a focus F at the intersection of the planes thereof. Foci F′, F are kept close to, or within, the body of heads 23, 23′ allowing them to pivot over a minimum radius, virtually upon themselves. Thus, each picker head 23 for example is supported to be pivotable about an axis closely adjacent its own confines, i.e. within or close to the cross-sectional outline of the assembly comprising knife block 21 and insert 230. Thus, each flexure pivot arrangement might be characterized as a V flexure pivot (for instance, as opposed to a crossed (or X) flexure arrangement) and is adapted to locate its pivot axis (F) advantageously at, or close, to the plane of the picker knife edges mounted thereby. It is preferred that bends 250, 250′ be formed so that the legs of spring plates 25, 25′ diverge orthogonally to define an angle of about 90°, although this may be varied somewhat. Of course, the bend angle must be sufficiently acute to space clamp 26 and projecting bolts 29 adequately from knife bases 27, 27′ to prevent contact therewith, as seen below. The ends of flexure springs 25, 25′ are rigidly clamped to the sides of a pair of knife bases 27, 27′ with bolt means 22 through a pair of gibs 220 which distribute clamping pressure.

Figure 2:
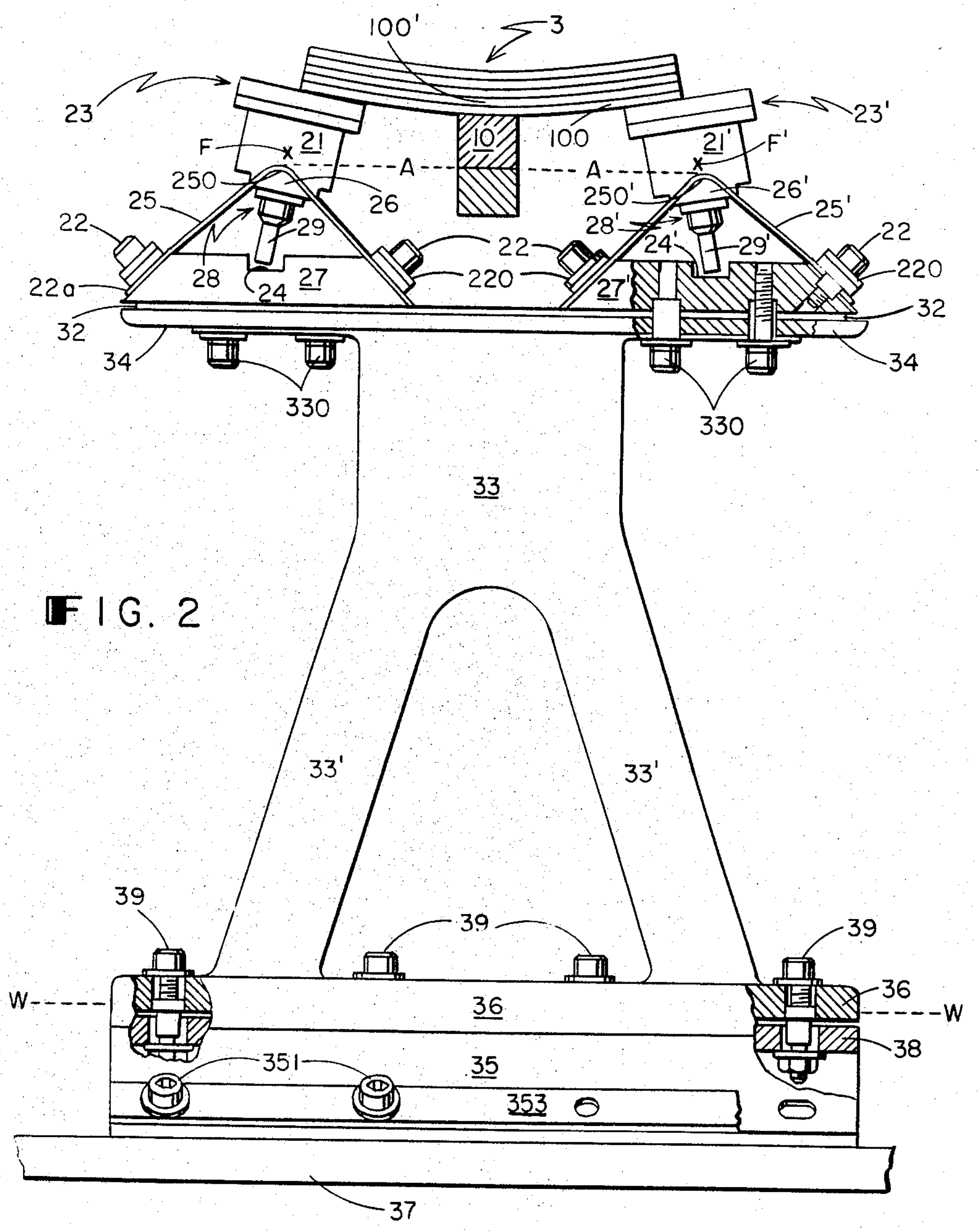
FIGURE 2 is a plan view of the feed mechanism in the embodiment of FIGURE 1.

The sides of knife bases 27, 27′ may be suitable beveled to allow a smooth conformance to the attitude assumed by the legs of flexure springs 25, 25′ to prevent further pre-stressing thereof. Bases 27, 27′ thus fix the attitude of knife units 23, 23′ projecting therefrom so that, when bases 27, 27′ are affixed to plate 32 (as described below), the card-engaging edges 231, 231′ of inserts 230, 230′ are relatively parallel to the edge of a normal, "straight" card when it is presented for picking along hopper base 7. This is the reference or "home" position to which knives 23, 23′ will tend to return in a self-straightening (self-leveling) action. From this position, it will be seen that the resilience of arcuate flexure plates 25, 25′ will allow knives 23 to be pivoted about foci F, F′ to resiliently conform to the bow of a punched card 1 as shown in FIGURES 1 and 2. Knife bases 27, 27′ are intermediately relieved adjacent their intersection with projecting bolt ends 29, 29′ so as to form "cam-slots," or limit-stops, 24, 24′ therefor and thus prevent the overstressing of flexure leaves 25, 25′. Slots 24, 24′ will accordingly be large enough to accommodate the pivoting of stud bolts 29, 29′ when knife units 23, 23′ are pivoted. That is, with knife-edges 231, 231′ at "home attitude" (i.e. aligned parallel to card-axis A—A, are parallel to the edge of the "straight" card), slots 24, 24′ are sufficiently oversized to allow knife-bolt assemblies 23–29, 23′–29′ to pivot a controlled amount. This amount will be enough to accommodate a "fair" degree of (concave or convex) card-bow, but not enough to overstress and fatigue leaf-springs 25, 25′. Cam-slots 24, 24′ thus cooperate with bolts 29, 29′ to provide a limit of spring flexure and knife-pivoting displacement. Preferably, flexure spring-plates 25, 25′ comprise thin plates of spring steel, or similar material, many times wider than they are thick to provide considerable rigidity along the plane of the spring plate. Plates 25, 25′ are long enough to accommodate a reasonable displacement of clamp members 26, 26′ from knife bases 27, 27′. Spring steel about .005″ thick has been found suitable for this purpose, but it will be appreciated that other equivalent materials of equivalent dimensions may be substituted therefor to resiliently mount picker knife units 23, 23′ on plate 32. Likewise, other flexure-leg structures may be substituted for unitary plates 25, 25′ as long as they diverge from a focus closely adjacent the confines of the knife units to allow the resilient, "quick" pivoting thereof about radii of no appreciable length. The convergence of these leg structures, whether they comprise one unitary plate having convergent leg portions or separate leg plates, may be otherwise defined in terms of the axes along which the legs, or leg portions, project from the base structure. That is, these axes converge adjacent the pivoted element and the plate structures comprising the leg pairs define normals to their axis and along their planes that are parallel. Equal-length portions of these leg pairs may be seen to define the sides of an isosceles, perhaps truncated; that is, of an isosceles triangle having symmetrical, equal sides.

Picker knives 23, 23′ and plate 32 are kept in prescribed pivotable relation with a fixed wall portion 37 of the main frame (not shown) of a card-handling machine by a rigid pivoting picker arm 33. Knives 23, 23′ and pivot arm 33 are, in turn, coupled to be driven by the eccentric reciprocation of crank 31 through a flexible connector, flexure plate 32. Bolts 330 may be inserted through registering bores in flexible plate 32, in knife bases 27, 27′ and in the terminal flange portion 34 of picker arm 33. Thus, a rigid, clamping connection is made between arm 33, crank flexure 32 and knife bases 27, 27′. Picker arm 33 comprises an elongate metal bar terminating in a pair of symmetrical, divergent leg portions 33′ at the end thereof opposite flange portion 34. Legs 33′ are joined by an integral foot portion 36. Arm 33 is thus designed to comprise a relatively flat, thin structure overall, being cut-out to form legs 33′ so as to comprise a rigid, elongate connector having minimum mass and presenting a very low weight (torque) load to crank 31. Arm 33 is relatively wide, especially at its ends, i.e. along flange 34 and along foot 36, so as to provide a structure which is relatively rigid and stable along axis A—A between foci F, F′, thus maintaining knife edges 231, 231′ aligned properly. It will be noted that picker arm 33 is resiliently mounted from wall 37 by flexure plate connection similar to that between picker knives 23, 23′ and their associated bases 27, 27′. Thus, foot portions 36 is fixedly connected to the midsection of a resilient flexure plate 35 so as to allow the non-frictional reciprocation of arm 33 about a closely adjacent pivot axis "W—W" comprising the intersection or focus of the planes of leg segments 35′. As in the case of flexure springs 25, flexure leaf spring 35 includes a relatively orthogonal, smooth intermediate bend 350 between a pair of symmetrically diverging legs 35′. Bend 350 is sufficiently acute to space foot portion 36 adequately from a pivot base 40 and sufficiently obtuse, or shallow, to space the ends of leaf 35 relatively distant, for a stable, high-torque connection between wall 37 and arm 33. Similarly, foot portion 36 is cut-out to accommodate this bend 350 and clamped with suitable bolts 39, to a conformingly convex portion of an arm clamp 38. Clamp 38 is affixed to foot portion 36 with bolt means 39. The ends of flexure plate 35 may be affixed to opposite sides of the pivot base 40 which, in turn, is fixably mounted from wall portion 37. The connecting sides of base 40 may be beveled to conform to the angular engagement of the ends of leaf spring 35, as with leaves 25, 25′ and is removably affixed thereto through suitable bolt means 351 cooperating with a pair of clamping gibs 353. Like knife bases 27, 27′, arm base 40 is slotted at 41 to accommodate the pivoting of bolts 39, acting as a stop means to limit the pivoting excursions of arm 33 (i.e. in the direction of arrows P—P). Slot 41 thus limits the pivoting excursion of knives 23, 23′ and prevents overstressing spring 35. Thus, pivot arm 33 and its support assembly act to maintain picker knives 23, 23′ spaced a constant radius from fixed wall 37, being pivotable at high speeds with no abrading wear using a simple flexure means. The described pivot assembly also provides a low inertia load to match the optimum efficiency of the low inertia printed circuit motor 13. Such a motor is highly advantageous for employment with picker units due to its low starting inertia and field-control characteristics whereby the regulation of applied motor current can control motor speed and by reversal of this current stop the motor very quickly. Such deceleration can be done so quickly, within a card-selection cycle, that brakes are eliminated. The fast starting characteristics of the motor make a clutch unnecessary. Thus such a printed circuit motor is highly advantageous if its requirements, such as low-torque loads and quick-reacting picker supports, can be met. It will be appreciated that the inventive arrangement accommodates these requirements. For instance, the flexure plate support means are both of low-mass and react quickly to position card selecting elements. The driving excursions of crank 31, as indicated in FIGURE 3, besides thrusting the crank 31 normal to the plane of picker arm 33, also tend to rock crank 31 pivotably about arm 33, due to eccentric coupling 17. This pivotably flexes flexure plate 32, as indicated at 32′. Such a flexure plate connection, which eliminates wear-points and the like, will be recognized as contributing to the wear-proof features of the overall system.

*Operation*

The operative elements of the above-described embodiment of the invention may be more clearly understood with reference to the following description of their operation. A signal, for instance, an order to "read a card" from a Central Processing Unit, may be provided to start picker motor 13, rotating the motor shaft 15 (FIGURE 1) and thus rotating eccentric coupling 17, fixedly attached to shaft 15. Crank 31 is rotatably journaled to eccentric shaft 19 projecting from coupling 17 and will thus be driven to reciprocate in a circular orbit in turn to drive arm 33 along path P—P, pivoting it about axis W—W reciprocatingly. Picker heads 23, 23' will then be reciprocated, being guided by arm 33, along a fixed arcuate path toward and away from, feed passage 5 and cards 1 etc. Thus, referring to FIGURE 3, the lower tips 233, 233' of heads 23, 23' will first be wiped upwardly against the plane of punched card 1, driving thte knife edges 231, 231' upwardly to clear the top, or "12-edge," of the card. Thereafter, the continuing reciprocation of crank 31 will pull knife edges 231, 231' downwardly to engage this card edge and thrust the card (down the cam-face of throat block 10, if necessary) through passage 5 and toward delivery station 8. Rollers 11, 11' will then quickly advance card therebeyond to clear the "picked" card in time for a succeeding card to be engaged by the picker knives 23, 23' and so on.

In certain cases, however, the presented card 1 will be slightly bowed, either concavely or convexly as in FIGURES 1 and 2. In either case, picker knives 23, 23' will tend to align themselves conformingly along this bow curve, thus continuously engaging knife 231, 231' along the card edge. The pressure of the card 1 against the flat of the lower knife surfaces 233, 233' will tend to pivot them about foci F, F' of their supporting arcuate flexure plates 25, 25' respectively and away from the home or "straight," position (axis A—A). The degree of this yielding excursion or card-conformation will, of course, be limited, by the stop-limit action of bolts 29, 29' in grooves 24, 24'. Besides this card-conforming resilience, picker knives 23, 23' will also be self-straightening. That is, having been stressed to follow the bowed configuration of a card, flexure leaves 25, 25' will urge the knife-edges back into alignment along "reference" axis A—A, thus quickly returning to properly engage a following card. That is, knife-edges 231, 231' will tend to center themselves quickly along "straight-axis" A—A after advancing a bowed card. This will re-position them to most quickly follow the succeeding card (e.g. perhaps bowed oppositely). This self-straightening and self-return characteristic of the arcuate flexure leaf supports provided for the picker knives according to the invention, will thus facilitate fast accurate card feeding.

It will be readily apparent that the principles of the present invention are applicable to various other unit records and record-advancing systems for selecting and advancing records relative to a container in which they are stacked. Thus, the invention may be similarly applied to other forms of card feeding and advancing apparatus. For instance, other equivalent card-engaging means, such as suction grips, may replace knives 23, 23' being similarly suspended from flexures 25, 25'. Similarly, knife units 23, 23' may be connected to flexure plates 25, 25' by other arrangements equivalent to the described clamping arrangement. While it is preferable, for various reasons to form the legs of flexures 25, 25' from a single unitary plate, in certain cases a two part flexure may be used where pairs of flexure legs are substituted for each of flexures 25, 25', being separately connected to the respective knife units. It will be recognized, however, that using a unitary flexure arcuately clamped onto the knife head has certain advantages such as assembly convenience, prealignment between leg pairs, etc.

While in accordance with the provisions of the statutes, there has been illustrated and described the best form of the invention known, it will be apparent to those skilled in the art that changes may be made in the forms of the apparatus disclosed without departing from the spirit of the invention as set forth in the appended claims and that in some cases, certain features of the invention may be used to advantage without a corresponding use of other features.

Having now described the invention, what is claimed as new and for which it is desired to secure by Letters Patent is:

1. A simplified computer document feeding apparatus comprising:

a storage means adapted to support a plurality of documents placed therein; a document picker device positioned at one end of said storage means and adapted to sequentially advance documents therefrom to a document handling station; throat means positioned to cooperate with said picker device by defining a constricted passage for separating said documents so that only a single document will be fed during each advancement cycle; block means mounted adjacent said throat means for supporting documents and guiding them into said constricted passage; said picker device including support means pivotably coupled at one end with respect to a fixed base; motive means connected to reciprocate the other end of said support means; and a pair of document engaging means pivotably mounted at said other end of said support means to be spaced symmetrically about said block means and adapted, when driven by said support means, to engage said documents for the advancement thereof, flexure strip means coupling each of said engaging means to said support means to be resiliently pivotable with respect thereto, said strip means being adapted to render the engaging means pivotable virtually upon-itself, said strip means being self-straightening and conformable to curved edge-surfaces of said documents.

2. A simplified computer document feeding apparatus comprising:

a storage means adapted to support a plurality of documents placed therein; a document picker device positioned at one end of said storage means and adapted to sequentially advance documents therefrom to a document handling station; throat means positioned to cooperate with said picker device by defining a constricted passage for separating said documents so that only a single document will be fed during each advancement cycle; said throat means including block means for supporting documents and guiding them into said passage; said picker device including support means pivotably coupled at one end with respect to a fixed base means; motive means connected to reciprocate the other end of said support means; and a pair of document engaging means spaced symmetrically about said block means and pivotably mounted at said other end of said support means and adapted, when driven therewith, to engage said documents for the advancement thereof; V type flexure plate pivot means resiliently coupling each of said engaging means to said supporting means, said flexure plate pivot means comprising a pair of symmetrical divergent leg portions, each mounting an associated one of said engaging means so as to be pivotable, virtually upon itself and to be self-straightening and conformable to a curvilinear edge-portion of a document.

3. The combination recited in claim 2 wherein said storage means comprises a card hopper adapted to urge said documents against said block means and said engaging means; and wherein each of said pivotably mounted support means and engaging means is pivotable about a prescribed pivot axis located in close proximity to the cross-sectional confines thereof; and wherein said each pivotable mounting is effected by a pair of flexible plate portions connected to a respective one of said pivotable mounting means so that their planes intersect at a focus defining a pivot axis, each said pair of plates being disposed so that portions thereof form isosceles sides, diverging symmetrically about the normal between said pivot axis and a join between equal length portions of said plate pairs.

4. Selection apparatus for feeding computer card records comprising, in combination:

a magazine including throat means at one end towards which cards are urged to be fed singly; feed rollers cooperating to effect the high-speed withdrawal of cards past said throat means, block means positioned adjacent said throat so as to engage cards for alignment relative to said throat means; picker means disposed adjacent said block means for thrusting said cards through said throat means in prescribed alignment, said picker means including a pair of card-engaging means; and drive means adapted to reciprocate said engaging means in prescribed alignment relative to said magazine and stop-limited V type flexure suspension means coupling said drive means to each of said engaging means, said suspension means being adapted to render said engaging means pivotable virtually upon itself, said suspension means being self-referencing and card-conformingly resilient in a first direction while being relatively rigid in other directions.

5. The combination recited in claim 4 wherein each of said suspensions comprises a pair of flexure plate portions connected so that the planes thereof intersect at a focus line closely adjacent the confines of the supported engaging means.

6. In a unit record handling machine including a record container and a throat passage adjacent one end of said container, a record-feeding mechanism for cyclically thrusting individual records through said passage along a prescribed feeding plane, said mechanism comprising:

a throat block affixed adjacent said throat passage for engaging unit records adjacent intermediate bottom-edge portions thereof; rigid pivotable arm means coupled at one end to a fixed base so as to be reciprocable relative to said container at the other end thereof along a prescribed first arcuate path; reciprocating drive means connected to said arm means so as to reciprocate said other end along said path; and a pair of pivotable picker knife means mounted, through resilient suspension means, on said other end of said arm means to be reciprocated therewith along a second prescribed path, said second path coming tangent to said feeding plane through said passage, said knife means being spaced symmetrically about said block means for engaging top edges of said records for advancement thereof; said suspension means comprising a pair of symmetrically divergent leg portions connected to said knife means so that the intersection of their planes defines a pivot axis closely adjacent the cross-sectional confines of said knife means to render it pivotable virtually upon itself.

7. The combination recited in claim 6 wherein: said one end of said arm means is flexurally suspended from said base through a resilient pair of symmetrically divergent flexure plate leg portions connected to said arm so as to place their intersectional pivot axis closely adjacent the confines of said arm, thus rendering said one end virtually pivotably about itself; and wherein said leg portions suspending said arm means and said knife means are adapted to be stop-limited by plate leg structures and their associated slot portions disposed therebetween on respective non-pivoting surfaces, said pivotable means including stop projections adapted to engage associated ones of said slot portions to limit the flexural excursions of said leg portions.

8. In a computer record handling machine including an input feed path along which computer records are urged and an advancement path relatively, transverse to said feed path, and along which ones of said records are to be cyclically thrust through a throat passage, a picker mechanism for so thrusting said records comprising in combination:

block means affixed adjacent said passage to engage said records intermediate their ends so as to limit their travel along said feed path and to align them for said thrusting through said passage; picker drive means including a rigid arm portion, said drive means being arranged to reciprocatingly pivot a first end of said arm portion; and a pair of record-engaging means pivotably mounted on said arm end to present engaging surfaces for engaging said records in conjunction with said block means, said engaging means being mounted on pairs of flexure plates, so as to be resiliently pivotable about an axis located within the near proximity of the cross-section of said engaging means.

9. In an apparatus for manipulating unit record media wherein elements thereof are arranged to be reciprocatingly pivoted relative to non-pivoting base structures, pivot mounting means in combination therewith comprising:

pairs of flexure plate elements connected between associated ones of said elements and said base structures, said plate elements being disposed convergingly as a V type flexure suspension so that the planes thereof intersect along a focus defining a pivot axis in close proximity to the cross-section of the said supported element.

10. In a punched card handling apparatus, a card picker arrangement for selecting individual cards from an input magazine and advancing them through a throat passage to engage transport means, said picker arrangement comprising, in combination:

a single throat block affixed adjacent said throat passage and arranged to engage cards centrally of their bottom edge to align them for insertion through said passage; a pair of picker knife elements pivotably mounted on first and second coupling means respectively to be reciprocated between limits along a prescribed arcuate path so as to engage a top edge portion of successive cards intermediate the limits of said path and in conjunction with said block to thrust said cards through said throat passage, each of said knife elements being mounted to be resiliently pivotable relative to first base means about a pivot axis which is parallel to the plane of said path and which lies closely adjacent the confines of the respective knife element; a rigid, elongate pivot arm element mounted at one end on a third coupling means so as to be reciprocatingly pivotable relative to a second base means and connected at the other end thereof to said first base means so as to guide said knife elements along said path, said arm means being mounted to pivot about a pivot axis which lies closely adjacent the confines of said one end; and reciprocating drive means connected by a flexible plate to said arm means so as to reciprocate said knife elements along said path; said coupling means each comprising flexible plate means connected between said elements and associated base means; said plate means being disposed to present two leg portions extending convergently from each of said base means to said associated element so that the planes of said portions intersect along a focus line defining said associated pivot axis, said pivoting elements and said associated base means including cooperating stop means to limit the pivoting flexure of said plate means.

11. The combination recited in claim 10 wherein each of said flexible plate means comprises a single flexure plate bent to define a relatively orthogonal bend portion intermediate the ends thereof, said ends being affixed in spaced apart relation to respective base means and said bend portion being affixed to associated pivotable elements.

12. The combination recited in claim 11 wherein each of said base means includes a pair of stop-protrusions and wherein each of said bend portions has a projection extending toward said associated base means for engagement with said protrusions at prescribed limits of the pivoting of said element.

13. The combination recited in claim 12 wherein each of said flexure plates is clamped at its ends to portions of said associated base means and is clamped with bolt means at said bend portion to an associated pivoting element, said bolt means including an extension portion defining said projection.

14. The combination recited in claim 10 wherein said drive means comprises a printed circuit motor means including eccentric shaft means for reciprocating said arm means, said picker arrangement being arranged to present a low torque load for said motor means.

15. In a unit record handling apparatus including elements pivotably mounted on associated base surfaces, improved flexural support means comprising:

a pair of thin flexible plate portions affixed at one end thereof to spaced apart portions of each of said base surfaces to project convergingly therefrom, and affixed at the other end thereof to an associated one of said pivoting elements so that the planes of said plate portions intersect closely adjacent the confines of said respective element to define a single pivot axis therefor.

16. In a unit record handling apparatus including elements pivotably mounted on associated base surfaces, improved flexural pivot support means comprising:

a pair of thin flexible plate portions affixed at one end thereof to spaced portions of each of said base surfaces to project along projection axes convergingly therefrom, and affixed at the other end thereof to an associated one of said pivoting elements so that the normals to said axes along said plates are parallel, said plates thus defining a single pivot axis for said associated element.

References Cited

UNITED STATES PATENTS

| | | | |
|---|---|---|---|
| 2,289,010 | 7/1942 | Greenwood | 271—44 |
| 2,877,017 | 3/1959 | Luning et al. | 271—44 |
| 3,145,023 | 8/1964 | Cerf et al. | 271—44 X |
| 3,218,063 | 11/1965 | Boyce | 271—44 |

M. HENSON WOOD, Jr., *Primary Examiner.*

ALLEN N. KNOWLES, *Examiner.*